United States Patent Office 3,266,572
Patented August 16, 1966

3,266,572
STIMULATION OF PRODUCTION OF UNDERGROUND FLUIDS BY USE OF TECHNIQUES INVOLVING HIGH ENERGY COMBUSTION PRINCIPLES
Paul E. Woodward, Tulsa, Okla., assignor to The Dow Chemical Company, Midland, Mich., a corporation of Delaware
No Drawing. Filed Dec. 6, 1963, Ser. No. 328,487
6 Claims. (Cl. 166—38)

The invention is a method of treating a subterranean fluid-bearing formation traversed by a well, commonly referred to as treating a well, wherein a composition is injected down the wellbore of a well and forced back into the formation to effectuate an improvement in the conditions of the well or in the quality or the production rate of fluid from the well.

Oil, gas, brine, and water are produced from a subterranean formation, sometimes referred to as a reservoir, pay zone, interval, or horizon. The desired fluid is usually contained in the voids and interstices of a porous rock stratum in the formation. With little exception, the fluid from a subterranean formation is obtained by way of a wellbore penetrating the fluid-bearing stratum.

The desired fluid from a subterranean source is brought up the wellbore to the earth's surface, as a result of a pressure gradient, after penetration of an impervious cap rock. The pressure gradient may be natural or it may be produced through the instrumentality of pumps or by the injection of fluids such as water, oil, or gas into the peripheral regions of the producing interval which causes the desired fluid therein to be forced upwardly through a more-or-less centrally positioned production well. Where natural pressure is sufficient to cause a fluid to rise to the surface of the ground after a well has been drilled, in the case of oil is known as a gusher and, in the case of water as an artesian well. Only some wells are gushers or artesian wells and a large number of wells must be pumped or subjected to induced pressure to produce. In many instances, where a gusher or an artesian well does exist in the early stages of production, the pressure frequently subsides after a period of use whereupon the pressure must be either supplemented or supplanted by an artificial pressure system. Artificial pressure systems, whether referring to pumping directly from a single well or employing a plurality of wells, whereby a flooding fluid is injected down one or more wells to force the formation liquids in the direction of one or more producing wells, requires rather extensive equipment and entails high cost of operation, principally because a large amount of power is required to provide the necessary pressure to raise the fluid to the earth's surface.

Even by the unlimited use of power and pressure, in a practical sense, in the production of oil or water from an underground formation, a considerable amount remains in the formation. One reason for this residual fluid in the formation is because the fluid cannot find passageways through the formation in order to reach a producing well.

To overcome this difficulty, procedures and techniques have been developed whereby the formation rock is treated with an acidic material; by explosives including either solid or liquid explosive mixtures; by hydraulic pressures, i.e., pressures produced in a formation as a result of injecting a liquid down the wellbore and back into the formation at sufficient pressure to create fractures therein. Any of such procedures and techniques are sometimes referred to as well stimulation and the term, as used herein, has such meaning.

Although hydraulic fracturing and detonation of explosives positioned in a formation have resulted in rewarding stimulation of wells so treated, they have sometimes been disappointing because of certain undesirable concomitant effects therefrom. Hydraulic fractures tend to follow the more open, more accessible, or more porous portions of a formation being treated. This condition, unless corrected to some extent, results in excessive loss of treating fluid into the formation or at least inefficient use of the fluid.

Explosives have proved satisfactory in some instances but have continued to present a serious problem, viz, that they detonate too abruptly or sharply (i.e., substantially instantaneously) to result in benefits to the formation beyond a relatively limited zone. Very often the formation in the immediate vicinity of the wellbore is rubblized and the region beyond a rather small zone remains substantially unaffected. The result is that the rubble so produced is usually rather near to the foot of the wellbore; is actually of such a finely divided nature that the passage of fluid therethrough is badly impaired. In some formations, e.g., certain limestones, a conventional explosive has been known to compress the formation, thereby undesirably closing or partially closing passageways which already existed.

The invention contemplates a method of well stimulation wherein a first composition, which is one component of a hypergolic mixture, is injected down a wellbore followed by a spacer liquid unreactive with said component, and this in turn, is followed by a second component which is unreactive with the spacer liquid and forms a hypergolic mixture when brought into contact with said first component at the pressure and temperature existing in the formation, and the components of the hypergolic mixture are maintained in spaced-apart positions in the wellbore and successively displaced into the formation and thereafter forced a distance from the wellbore, whereby some of said components are intermixed in the formation to form a hypergolic mixture which results in a spontaneous, high energy, exothermic reaction which propagates at less than detonation velocity.

Due to the manner in which the components of the treating mixture are emplaced in the formation, the reactants come into contact with each other as a result of channeling or fingering and involves relatively small quantities of the components at any given time. The initial reactions create turbulence which encourages subsequent reactions. As a result, the ensuing combustion continues over a relatively long time and is carried on at comparatively greater distances from the wellbore than in heretofore known well stimulation techniques.

The term "hypergolic mixture" as used herein refers to one which is combustible spontaneously under existing conditions, i.e., one wherein combustion is initiated without the aid of an extrinsic igniting instrumentality. The combustion which occurs in the practice of the invention, as aforesaid, is of appreciable duration, being measurable in minutes in contrast to ordinary explosives wherein the duration is extremely short, usually being a matter of milliseconds.

To ascertain whether or not a specific fuel is hypergolic for purposes of the invention, with a given oxidizing agent, the following test may be conducted:

(1) Place 0.5 to 1.0 milliliter of the fuel being considered in a bomb provided with a pressure gauge and temperature gauge.

(2) Add the selected oxidizer, dropwise by means of a syringe equipped with a hypodermic needle, to the fuel.

(3) If ignition occurs and continues as the oxidizer is fed dropwise, the mixture clearly is hypergolic.

(4) If ignition does not occur upon the addition of oxidizer, the bomb may be heated to the temperature of the level of the formation to be treated. If ignition then occurs, the mixture is hypergolic.

(5) If ignition does not occur upon the addition at such temperature, the bomb may be pressurized to the pressure existing at the level of the formation to be treated. If ignition occurs, as evidenced by the changes in temperature and pressure within the bomb, the mixture is hypergolic for purposes of the invention.

The components of the hypergolic mixture are a selected reducing agent or fuel and a selected oxidizing agent. The spacer fluid may be any liquid which is substantially unreactive with either the fuel or oxidizing agent employed, e.g., water, brine, carbon tetrachloride, and the like. It is preferred, although unnecessary, that the spacer liquid have a viscosity greater than either the fuel or the oxidizing agent. Best results are obtained by employing a liquid of comparatively high viscosity, e.g., a thickened liquid such as water containing a gelling agent such as a dissolved natural or synthetic gum.

Either the fuel or the oxidizing agent may be injected down the wellbore first, followed by the spacer fluid, and this in turn by the other component of the hypergolic mixture. Thereafter, an inert liquid is injected down the wellbore in sufficient quantity to displace the first component of the hypergolic mixture, the spacer liquid, and the second component of the hypergolic mixture into the formation.

Sufficient spacer fluid must be employed to insure that the hypergolic components remain spaced apart in the wellbore. It is recommended that at least an amount of spacer fluid be employed which will provide at least five feet and preferably about 10 feet of linear separation between the components of the hypergolic mixture in the wellbore.

The ratio of fuel to oxidizer to employ is such that an effective hypergolic mixture results upon the contact thereof in the formation. Any amount of selected fuel will react with any amount of the selected oxidizing agent upon contact under the conditions existent in the formation. It is clear, of course, that the reaction will continue only until either component in contact with the other is exhausted. An effective hypergolic mixture is one that continues by propagation as commingling of the components continues to an extent sufficient to attain fracturing and shattering of the formation. Between 40 and 60 percent by volume of each component is customarily used. However, as little as about 10 percent of one and balance, to make a total of 100 percent, of the other component is quite satisfactory. Less than about 10 percent of either component is operable but is not recommended because the reaction will cease when one or the other component is spent.

In treating wells which contain crude oil that forms a hypergolic mixture with an oxidizing agent, the fuel is already in the well and merely must be displaced back into the formation away from the wellbore by a suitable spacer liquid before injecting an oxidizing agent, which forms a hypergolic mixture with the crude oil, down the wellbore and displacing it back into the formation.

The invention is best carried out by providing spacer plugs, e.g., of rubber, plastic, or the like, positioned between the liquids, which are of a size and resiliency which impede movement down the wellbore sufficiently to maintain the liquids on either side thereof out of contact with each other until they are ultimately forced into the formation.

The fuel employed includes amines, alkyl benzenes, sulfur-containing organic compositions, mono-alcohols, glycols, ketones, unsaturated hydrocarbons, crude oil, mixtures thereof, and the like. The preferred amines to employ are the unsaturated or aromatic amines. Among the sulfur-containing compositions to employ is butyl or amyl mercaptan. The preferred alcohol to employ is furfuryl alcohol. Illustrative of a satisfactory unsaturated hydrocarbon to employ is dicyclopentadiene. A particularly effective fuel mixture to employ is one comprising aniline and furfuryl alcohol. Such fuels as nitroalkanes and saturated hydrocarbons may be admixed with other more reactive fuels to provide the fuel component of the hypergolic mixture so long as they do not render the resulting mixture with the oxidizing agent non-hypergolic.

The following specific fuels are illustrative of those useful in the practice of the invention: ethyl alcohol, isopropyl alcohol, secondary-ethyl alcohol, tertiary-butyl alcohol, tertiary-amyl alcohol, n-amyl alcohol, diacetone alcohol, furfuryl alcohol, capryl alcohol, ethylene glycol, propylene glycol, acetone, methyl ethyl ketone, butyl mercaptan, mercaptoethanol aniline, benzene, xylene, cyclohexene, cyclohexane, monochloropropane, tetrachloropropane.

One embodiment of the invention, which offers advantages of economy together with efficacy, is that wherein the fuel comprises an alkyl benzene and an aromatic amine intermixed with a nitroalkane or a saturated hydrocarbon. Illustrative of this embodiment is a fuel consisting of between 10 and 30 percent xylene, between 10 and 40 percent aniline, and balance kerosene, naphtha, gasoline, diesel oil, gas oil, crude oil, or nitropropane. Kerosene is the preferred saturated hydrocarbon to employ in this embodiment because of its availability and low cost.

The oxidizing agents which may be employed are hydrogen peroxide, perchloric acid, a liquid halogen, nitric acid, fuming nitric acid, sulfuric acid, fuming sulfuric acid, and mixtures thereof. The preferred oxidizing agents to employ are nitric acid and fuming nitric acid because of their practicality and efficacy.

In the practice of the invention the fuel and oxidizer are introduced into the well separately and maintained out of contact with each other in the wellbore and on first entering the formation, by a spacer fluid. As injection proceeds, the spacer fluid and the injected fuel and oxidizer become commingled in the formation. As commingling occurs, a state of combustion is thereby initiated in the formation. Thereafter, combustion continues and extends over a period of minutes further commingling the materials until the reaction completes itself.

The following example is illustrative of the practice of the invention:

A 490-foot depth well, cased with a 5½-inch casing having 4 perforations at about 483 feet and a bottom hole temperature of 65° F., was treated. A string of 2-inch tubing extended down the casing to a distance below the perforations. A packer was set, between the tubing and casing, at a depth of 472 feet. Pumping equipment and suitable piping therefrom to the wellhead including flow control means were positioned at the well site.

30 gallons of furfuryl alcohol were injected down the wellbore. A plug of resilient synthetic rubber, of suitable size to fit snugly in the tubing, was then inserted in the tubing and 12 gallons of an aqueous solution of polyacrylamide to provide a thickened or high viscosity spacer liquid (having a viscosity of about 150 centipoises at 80° F.) were injected down the tubing. A second resilient plug was placed in the tubing and 30 gallons of fuming nitric acid then injected down the tubing at an average pressure of about 200 p.s.i.g. (pounds per inch gauge pressure). A third resilient plug was inserted in the tubing. Thereafter, water was pumped down the wellbore at the rate of 0.5 to 1 barrel per minute, displacing the alcohol, aqueous solution, and fuming nitric acid into the formation. When the components of the hypergolic mixture were brought into contact with each other in the formation, the pressures fluctuated, rising first to 550 p.s.i.g. and ultimately to a peak pressure of 850 p.s.i.g.

The pressure necessary to fracture the formation was known to be below about 500 p.s.i.g. and, accordingly, the pressure created as a result of combustion induced by intermingling of the injected oxidizer and fuel in the formation were clearly in excess of that pressure. The bottom hole temperature during treatment rose to 138° F.

After treatment, the pressure required to displace liquids into the well fell to less than the normal required for the formation indicating that fissures or voids had been created in the formation.

The results of the test show that a more-or-less continuous combustion occurs, over an extended period of time, consisting of a series of high pressure, high temperature reactions in the formation at an appreciable distance from the wellbore, as evidenced by the gradual but moderate temperature rise and the fluctuations in pressure as measured in the borehole.

Following treatment, the equipment was removed from the wellbore. Examination by caliper measurements showed that the casing of the well had been unaffected by the treatment.

The above example illustrates one mode of practicing the invention. Other fuels, spacer liquids, and oxidizing agents, as earlier described and as hereinafter claimed, may be used. For example, in place of furfuryl alcohol, any of the specific fuels set out hereinbefore may be used, including crude oil, which meets the fuel test, previously described, for forming a hypergolic mixture with the selected oxidizer, e.g., nitric acid. On the other hand, instead of the fuming nitric acid employed in the example, any of the oxidizers suggested hereinabove may be used.

Having described my invention, what I claim and desire to protect by Letters Patent is:

1. The method of treating a formation penetrated by a wellbore which consists essentially of injecting down the wellbore a first component of a hypergolic mixture selected from the class consisting of liquid fuels and liquid oxidizers; injecting down the wellbore a spacer liquid which is substantially chemically inert to said first component; injecting down the wellbore a second component, to which said spacer liquid is substantially inert and which creates a hypergolic mixture when brought into contact with said first component, which is maintained spaced apart from said first component by said spacer liquid in the wellbore; injecting down the wellbore a liquid which is substantially inert to said second component in an amount sufficient to displace said first component, spacer liquid, and second component into the formation thereby to bring about some intermingling of said first and second components in the formation at a distance from the wellbore to cause combustion between said components and accompanying heat, pressure, and turbulence, extending over an appreciable length of time, whereby fractures are created and portions of the formation relatively remote from the wellbore are shattered and rendered more permeable.

2. The method of treating a subterranean formation in accordance with claim 1 wherein said spacer liquid has a viscosity greater than that of said oxidizing agent and said fuel.

3. The method according to claim 2 wherein said spacer liquid is thickened liquid selected from the class consisting of gelled oil and gelled water.

4. The method according to claim 1 wherein the liquid fuel is one which forms a "hypergolic mixture" when admixed with an oxidizer selected from the class consisting of hydrogen peroxide, perchloric acid, a liquid halogen, nitric acid, fuming nitric acid, sulfuric acid, fuming sulfuric acid, and mixtures thereof, in accordance with the test of a "hypergolic mixture."

5. The method of treating a subterranean formation penetrated by a wellbore, wherein a hypergolic composition is produced in the formation by injection of components of such composition down the wellbore and into the formation, consisting of the steps of injecting down the wellbore a fuel selected from the class consisting of aliphatic and aromatic amines, mercaptans, alcohols, unsaturated hydrocarbons, and mixtures thereof; injecting a spacer liquid which is substantially inert to said fuel; injecting an oxidizing agent with which the spacer liquid is substantially inert, the fuel and oxidizer being thus spaced apart by the spacer liquid while in the wellbore, the relative volumes of the fuel, spacer liquid, and oxidizing agent being sufficient to permit penetration into the formation of oxidizing agent and fuel before intermingling thereof; and injecting a liquid unreactive with the oxidizing agent to displace the fuel, spacer liquid, and at least a part of the oxidizing agent into the formation, so that at least some of the oxidizing agent is brought into contact with the fuel in the formation thereby creating a hypergolic mixture which results in a spontaneous high energy exothermic reaction which propagates to portions of the formation relatively remote from the wellbore, said reaction initiating further mixing and reaction as the oxidizing agent continues to come in contact with the fuel in the formation, whereby fractures are created and portions of the formation relatively remote from the wellbore are shattered and rendered more permeable.

6. The method of treating a subterranean formation penetrated by a wellbore, wherein a hypergolic composition is produced in the formation by injection of components of such composition down the wellbore and into the formation consisting of the steps of injecting down the wellbore an oxidizing agent selected from the class consisting of hydrogen peroxide, perchloric acid, a liquid halogen, nitric acid, fuming nitric acid, sulfuric acid, fuming sulfuric acid, and mixtures thereof; injecting down the wellbore a spacer liquid which is substantially inert to said oxidizing agent; injecting down the wellbore a fuel which forms a hypergolic mixture when in contact with said oxidizing agent and to which said spacer liquid is substantially inert, the relative volumes of the oxidizing agent, spacer liquid, and fuel being sufficient to insure penetration into the formation of at least some of both fuel and oxidizing agent before intermingling thereof; and injecting a liquid unreactive with said fuel to displace the oxidizing agent spacer liquid and at least a part of the fuel into the formation so that at least some of the oxidizing agent is brought into contact with the fuel in the formation thereby creating hypergolic mixtures at such places of contact which results in a spontaneous high energy exothermic reaction which propagates to portions of the formation relatively remote from the wellbore, said reaction initiating further mixing and reaction as the fuel continues to come in contact with the oxidizing agent in the formation whereby fractures are created and portions of the formation relatively remote from the wellbore are shattered and rendered more permeable.

References Cited by the Examiner

UNITED STATES PATENTS

| | | | |
|---|---|---|---|
| 2,863,510 | 12/1958 | Tadema et al. | 166—38 |
| 2,920,041 | 1/1960 | Meadors | 166—9 X |
| 3,075,463 | 1/1963 | Eilers et al. | |
| 3,104,706 | 9/1963 | Eilers et al. | 166—42.1 |

CHARLES E. O'CONNELL, *Primary Examiner.*

JACOB L. NACKENOFF, *Examiner.*

S. J. NOVOSAD, *Assistant Examiner.*